United States Patent [19]

Melchert

[11] Patent Number: 4,544,126

[45] Date of Patent: Oct. 1, 1985

[54] MOLDING APPARATUS FOR SIMULTANEOUSLY FORMING A CAVITY AND ENCAPSULATING A FRAME IN A FOAMED BODY

[75] Inventor: Walter K. Melchert, Warren, Mich.

[73] Assignee: General Motors Corporation, Detroit, Mich.

[21] Appl. No.: 656,750

[22] Filed: Oct. 1, 1984

[51] Int. Cl.⁴ .......................... B29C 1/00; B29C 1/14; B29D 3/02
[52] U.S. Cl. ........................................ 249/83; 249/171
[58] Field of Search ................... 249/83, 91, 117, 170, 249/171, 160

[56] References Cited

U.S. PATENT DOCUMENTS 3,248,758  5/1966  Schmitz et al. ...................... 249/83
3,264,382  8/1966  Angell et al. ....................... 249/83
3,840,627  10/1974  Rhodes ................................ 249/83

Primary Examiner—Willard E. Hoag
Attorney, Agent, or Firm—Randy W. Tung

[57] ABSTRACT

A dual lid molding apparatus for a two-stage molding process which provides for frame encapsulation in a foamed article also having a molded-in cavity. The molding apparatus is constructed by pivotally connecting two mold closure members at each side of a female base mold. The two mold closure members are sequentially engaged with the female base mold during the two-stage molding process. A frame member and a multitude of cavities may be embedded in the foamed article by using this technique.

2 Claims, 6 Drawing Figures

MOLDING APPARATUS FOR SIMULTANEOUSLY FORMING A CAVITY AND ENCAPSULATING A FRAME IN A FOAMED BODY

FIELD OF THE INVENTION

This invention relates to a dual lid molding apparatus for a two-stage foam molding process which provides for frame encapsulation in a foamed article also having a molded-in cavity.

BACKGROUND OF THE INVENTION

Automobile seats typically include a cushion molded of flexible urethane foam material to absorb impacts occurring during the operation of a vehicle. The seats also require several pieces of hardware for seat adjustment, for instance, a seat back lock and recliner, seat adjuster switch and wiring harness. These items must be installed in close proximity to the seat foam section.

In a conventional seat design where the seat cushion is a solid foam bun, seat adjustment accessories are mounted on the outside of the seat foam section. As a consequence, decorative plaques are required to cover the accessories for appearance reasons. This involves extra cost in both materials and labor. In certain instances, where mounting of accessories inside the foam section is desired, a section of the foam bun must be manually cut out in order to provide the necessary space. This also has proven to be a costly and labor intensive process.

With the recent trend of down-sizing in the automotive industry to produce fuel efficient vehicles, more efficient utilization of vehicle interior space becomes critical. Since vehicle seats in general occupy a substantial portion of the interior space of a vehicle, efforts have been made in the industry to design compact and space saving seats. One of such space-efficient seat designs is an integral seat where most of the accessories or hardware attachments are mounted inside the seat foam section. This design achieves maximum utilization of the interior space while minimizing the manufacturing cost of a vehicle.

It is therefore an object of this invention to provide a molding apparatus for producing a frame encapsulated foam article such as a seat which contains a built-in cavity to subsequently accommodate seat adjustment accessories.

It is another object of this invention to provide a molding apparatus such that it can be used in an automated production process to produce foam articles having a frame member and an adjacent cavity encapsulated therein.

SUMMARY OF THE INVENTION

In accordance with a preferred practice of my invention, a mold assembly having three mold members for molding a unitary foam article having a frame member and an adjacent cavity encapsulated therein can be constructed as follows. First, a female cavity mold containing an interior mold surface for shaping the exposed surface of the foam article is constructed as the common base mold body. This female base mold has a flat mating surface around the periphery of the cavity for sequentially sealing against a second and a third mold member when such mold members are alternately placed on top of the base mold.

A second mold piece acting as a closure member is pivotally hinged at one end to one side of the female base mold. This second mold member similarly contains a sealing surface to seal around the first mold cavity when mated with the sealing surface on the female base mold in a closed position. This first mold cavity defined by the interior mold surfaces of the first female base mold and of the second mold member when in closed position is the shape of a first portion of the foam body to be molded. Foamable materials are injected through a passageway in the second mold member into such mold cavity. The foamable materials react and expand to fill the mold cavity forming the first foamed section having the shape of an automobile seat.

The mold assembly further contains a third member (the second closure member) which is pivotally hinged to the female base mold on a side of the mold opposite to the side to which the second mold member is hinged. The third mold member similarly contains a flat area for sealing purposes when mated with the sealing area on the first female base mold. A frame member is detachably secured by mechanical means to the interior mold surface of the third mold member so as to provide a second mold cavity between said member and said frame in closed position. This second mold cavity is open to the first-foamed section at the periphery of the frame member. When the second mold member is withdrawn, i.e., in an upright position, the third mold closure member is closed on top of the first female base member forming the hollow section desired in the article defined by the frame member and the exposed surface of the first-foamed section. The third mold closure member also contains a passageway for filling foamable materials.

The functions of each mold piece in the mold assembly can be summarized as follows. First, the second mold member and the third mold member are both initially in an upright position to facilitate cleaning and application of mold releases in the female base mold. After the second mold member is lowered onto the sealing surface of the female base mold member, urethane foam precursor material is injected through the passage in the second mold member to fill the mold cavity formed between the two members. This first foam injection process completes the flexible foam section contained in the foam article. After the foam has fully reacted and expanded, a short period of time is allowed to ensure that the foam is fully cured. The second mold member is then withdrawn by pivotally opening it to the upright position.

After a rigid seat frame is removably attached to the interior mold surface of the third mold member, the third mold member is sealed at its sealing surface against the same on the female base mold. A second mold cavity is formed between the frame member and the previously molded first portion of the foam body. This second mold cavity is left intact as the hollow section desired in the foamed article. Urethane foam precursors are injected through a passage located in the third mold member to fill the small cavity formed between the interior mold surface of the third mold member and the rigid frame member. The foam precursor material flows and expands on the back of the frame member until it meets the previously molded foam section at the periphery of the frame member and thereby forming a unitary foamed article having a frame member and adjacent cavity encapsulated in urethane foam.

DESCRIPTION OF THE DRAWINGS

This and other objects, features and advantages of the invention will become apparent upon consideration of the specification and the appended drawings, in which.

DESCRIPTION OF THE PREFERRED EMBODIMENT

Figure 1:
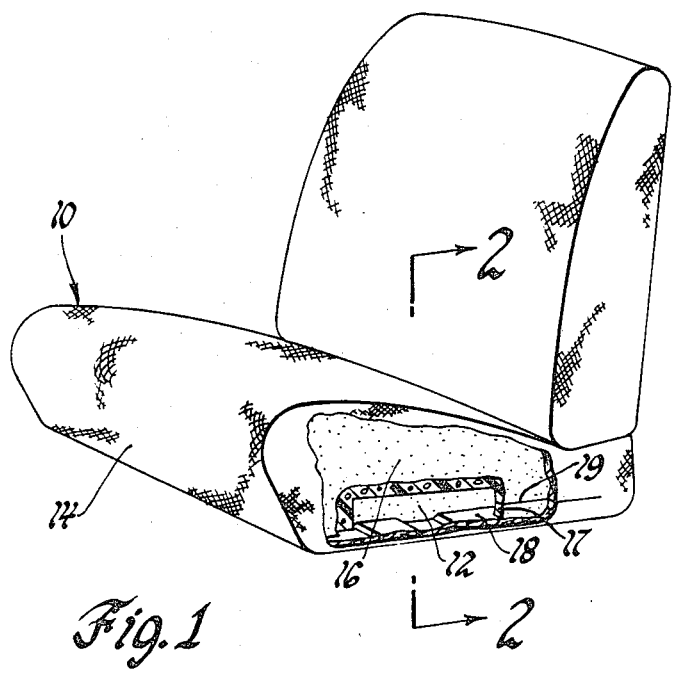
FIG. 1 is a perspective view with partial cutaway showing an automobile seat having an encapsulated frame and a molded-in hollow section.
Figure 2:
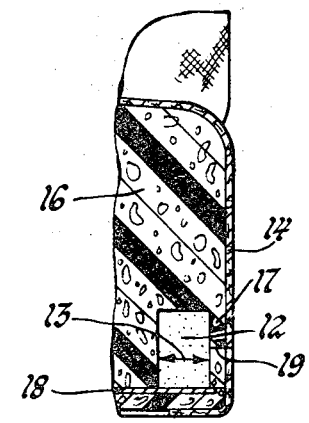
FIG. 2 is a partial sectional view taken from FIG. 1 showing the seat foam section containing the void.

Referring initially to FIG. 1, it is seen that a frame encapsulated vehicle seat 10 having a molded-in hollow section 12 is comprised of a cover 14 of a decorative vinyl or fabric material, a molded foam base 16, and an encapsulated frame member 18. The hollow section 12 in FIG. 1 runs approximately to the whole depth and one-third of the height of the foam base of the seat, while the width 13 of the hollow section 12 (FIG. 2) is approximately 3 to 4 inches. The shapes and dimensions of the hollow section can be custom designed to fit each particular design requirement of a specific seat cushion to allow the installation of seat adjustment hardware. Since the hollow section is located inside the foam base of the seat, a slit opening 19 (FIGS. 1 and 2) must be cut along the outside edge 17 of the foam base in order to provide access for installation of seat adjustment accessories. The obvious advantage of utilizing this molded-in hollow section is that after the accessories are installed, they are hidden by the foam base and the seat cover. Consequently, no additional decorative plaque has to be installed in order to hide the accessories such as in the case of a conventional seat design where the accessories are mounted outside the foam base of the seat. Significant cost savings in both labor and materials can be realized in the manufacturing of vehicle seats.

Various accessories for seat adjustment can be installed in the molded-in hollow section. This includes the mechanical components for a seat reclining and locking unit, the electrical switch box for a power seat adjuster, and any other components used for seat adjustment. With the recent advancement in high technology seats, where the needs for space saving and for infinite adjustment capability to fit a human body are emphasized, other seat adjustment mechanisms such as that necessary for thigh support or back support may also be installed in the hollow section. The hollow section may be located only on one side of the seat or on both sides of the seat. It is suggested that as long as the width of the hollow section is limited to approximately 3 to 4 inches, the comfort of a seat will not be affected. The hollow section may also be located in the rear portion or in the front portion of the seat to allow the installation of additional seat adjustment hardware.

Figure 3:
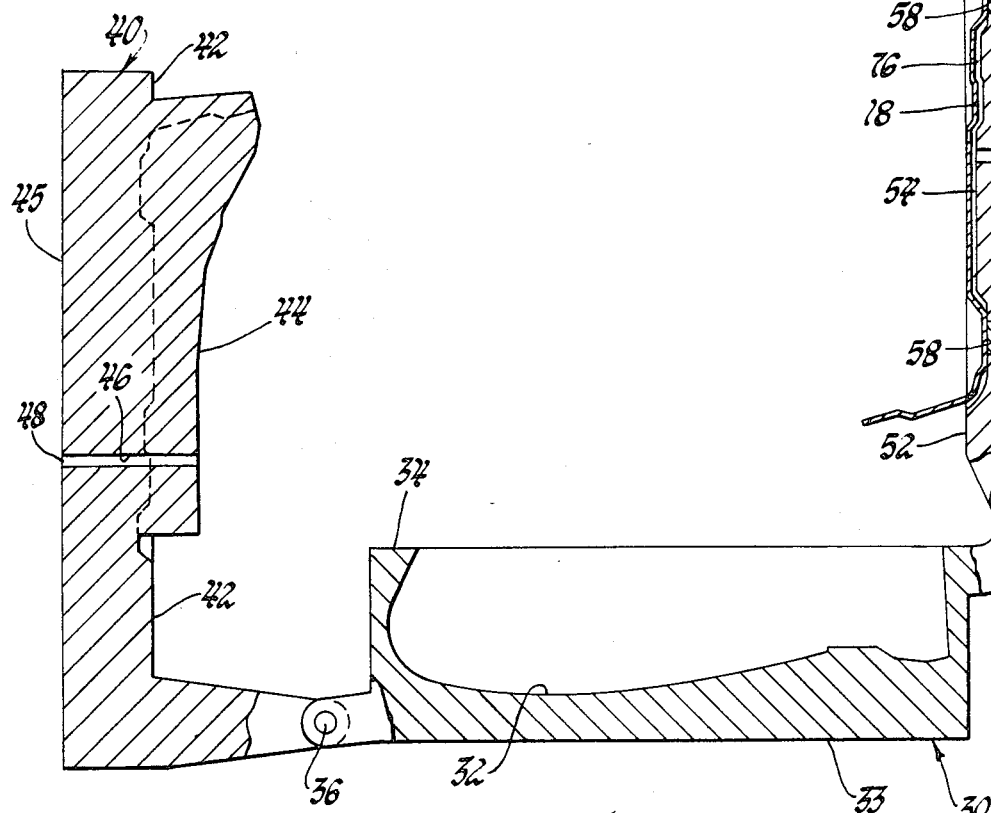
FIG. 3 is a sectional view of the mold assembly with the second and the third mold members both in the open position.

Referring to FIG. 3, there is shown a mold apparatus for practicing the method of encapsulating a frame member and a hollow section within a foam base. The mold apparatus in FIG. 3 is comprised of three mold members, namely, the female base mold 30 as the first mold member, the second mold member 40, and a third mold member 50. It is seen that the two mold members 40 and 50 are each pivotally hinged (indicated at 36 and 37) to sides of the female base mold 30 so that they can be rotationally closed and opened on the female base mold 30 about the hinged point. The mold members can be constructed of suitable mold materials such as steel, aluminum, or epoxy. The size of the mold member would depend on the size of the foamed article desired.

Figure 4:
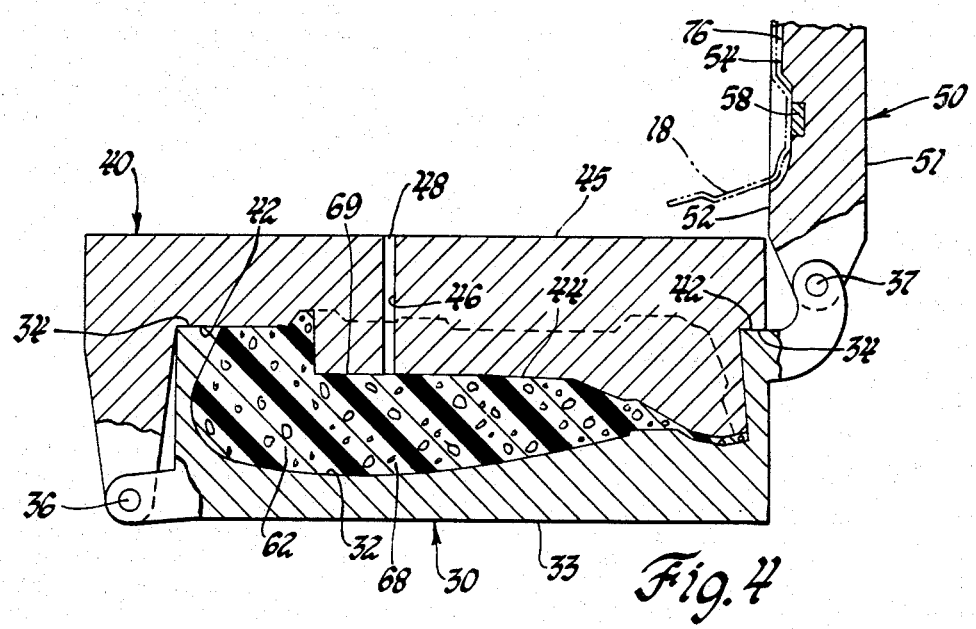
FIG. 4 is a sectional view of the mold assembly with the second mold member in the closed position showing the first stage molding process.

At the start of the molding operation, as shown in FIG. 4, the second mold member 40 is first rotated downwards about its hinged point 36 until a seal is effected on the mating surfaces of 42 and 34. In this closed position, a mold cavity 62 defining the first molded foam section is formed between the mold surface 32 of the female base mold 30 and the mold surface 44 of the second mold member 40. A mechanical clamping device (not shown) is utilized on the outer mold surfaces 33 and 45 in order to sustain the foam expansion pressure during the foaming cycle. A passageway 46 located in the second mold member 40 is used to fill the mold cavity 62 with foamable materials. This is most likely accomplished by injecting a mixture of foamable materials from the opening 48 of the passageway 46 under pressure. After the foamable materials are reacted and fully expanded in cavity 62, a short period of time in the order of minutes is allowed to cure the foam while being held under pressure between the two mold members. The second mold member 40 is swung open about its hinged axis 36 after this curing cycle to complete the first stage foam molding.

Figure 5:
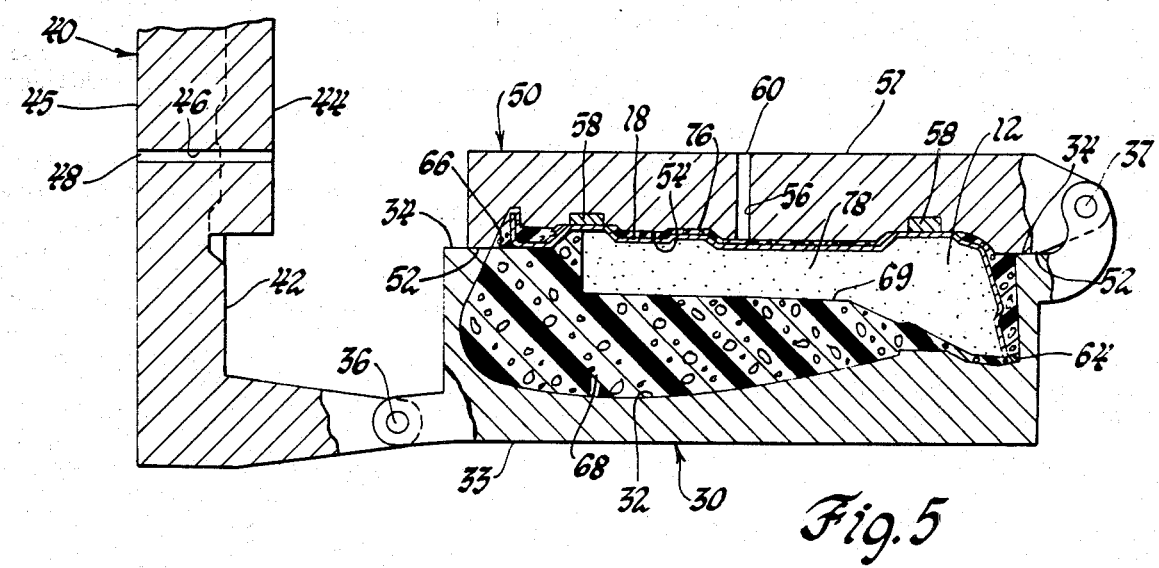
FIG. 5 is a sectional view of the mold assembly showing the third mold member in the closed position and the second stage molding process.

The second stage foam molding process is commenced by attaching a frame member 18, i.e., most likely a rigid steel member, to the interior mold surface 54 of the third mold member 50 (FIG. 4). A variety of means may be utilized to attach the frame member to the mold. A magnetic means whereby magnets 58 are flush mounted on the interior mold surface 54 of the third mold member 50 is depicted in FIG. 4. Other mechanical means of detachably mounting a frame to the mold surface such as using spring clips may also be utilized. It is important to note that a space 76 (FIG. 4) must be allowed to remain in between the detachably mounted frame member 18 and the interior mold surface 54 of the third mold member 50. After the frame member is detachably mounted to the mold surface, the third mold member 50 is rotationally closed about its hinged axis 37 onto the female base mold 30 as shown in FIG. 5. A seal is effected between the sealing surface 52 on the third mold member 50 and the sealing surface 34 on the female base mold 30 when the two mold members are mated together.

Figure 6:
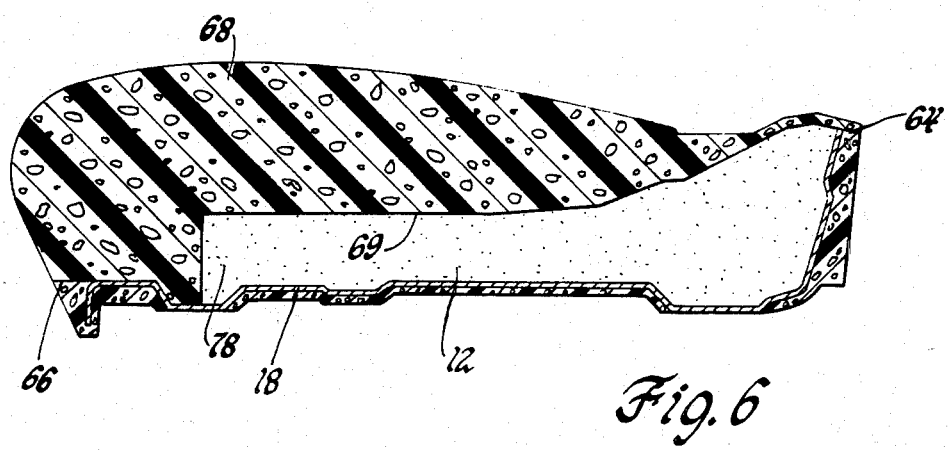
FIG. 6 is a sectional view showing a finished product of a seat foam member having a frame and a hollow section encapsulated therein.

At this stage of the molding, it is important to note that two mold cavities 76 and 78 are formed in this mold closed position. The large mold cavity 78 is formed in between the frame member 18 and the exposed surface 69 of the first-foamed section 68 molded in the first stage molding process. This large cavity 78 is to be left intact as the hollow section desired in the foam seat. The small mold cavity 76 is defined between the frame member 18 and the interior mold surface 54 of the third mold member 50. This mold cavity 76 is in open communication with the first-foamed section 68 at the periphery of the frame member 18, i.e., at 64 and 66 in FIG. 5. This open communication allows the foamable material injected at opening 60 through passageway 56 to join the first-foamed section 68 at 64 and 66 by the expansion and flow of the material. As a result, a completely encapsulated foam article having a frame member and a hollow section embedded therein is produced. A short period of time is similarly allowed for the second-foamed section to cure while the two mold members 30 and 50 are clamped under pressure by mechanical means (not shown) at surfaces 33 and 51. When this second stage foam molding is completed, the third mold member 50 can be swung open about its axis 37 to allow the demold of a completed foam article. The frame member 18, now an integral part of the foam article, is easily detached from the magnets 58. A sectional view of a finished seat foam section containing a molded-in hollow section is shown in FIG. 6.

It should be noted that even though only one hollow section is molded here in the example given, it is possible to have any number of hollow sections molded inside the foam bun. This technology is also not limited to the molding of vehicle seat foam. It can be applied to any foam article where molded-in hollow sections are desired.

The mold members, instead of pivotally hinged to each other, may be arranged in any one of many other suitable ways. For instance, the female base mold may be permanently positioned in the lower position in a press, while the two mold closure members are mounted in a shuttle arrangement where they are sequentially shuttled into the upper mold position in a press during the first stage mold and the second stage molding operations.

While my invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A mold for molding a hollow, unitary foamed article having a frame member embedded therein wherein said article comprises a first-molded foam section, a second-molded foam section integral with said first-molded section about the periphery of said frame member and at least one cavity between said sections and defined in part by said frame, said mold comprising:
   (A) a first mold member adapted to sequentially sealingly engage second and third mold members for shaping said article in at least two molding operations;
   (B) a second mold member coacting with said first mold member in a closed position to define a first mold cavity for shaping said first-foamed section;
   (C) a third mold member coacting with said first mold member in a closed position for positioning said frame member in spaced relation to said first-foamed section to define said cavity therebetween, said third mold member including means for detachably securing said frame member in spaced relation to said third mold member for release therefrom following molding of said second-molded section and such as to define a second mold cavity between said frame and said third mold member for shaping said second-foamed section, said second mold cavity being in communication with the first mold cavity at the periphery of said frame member for integrating said foamed sections together thereat.

2. A mold for molding a hollow, unitary foamed article having a frame member embedded therein wherein said article comprises a first-molded foam section, a second-molded foam section integral with said first-molded section about the periphery of said frame member and at least one cavity between said sections and defined in part by said frame, said mold comprising:
   (A) a first mold member adapted to sequentially sealingly engage second and third mold members for shaping said article in at least two molding operations;
   (B) a second mold member coacting with said first mold member in a closed position to define a first mold cavity for shaping said first-foamed section;
   (C) a third mold member coacting with said first mold member in a closed position for positioning said frame member in spaced relation to said first-foamed section to define said cavity therebetween, said third mold member including means for detachably securing said frame member in spaced relation to said third mold member for release therefrom following molding of said second-molded section and such as to define a second mold cavity between said frame and said third mold member for shaping said second-foamed section, said second mold cavity being in communication with the first mold cavity at the periphery of said frame member for integrating said foamed sections together thereat, and
   (D) means operatively associated with said members for pivotally connecting said first mold member to said second and third mold members to effect opening and closing of said mold.

* * * * *